US009816847B2

(12) United States Patent
Sasaki

(10) Patent No.: US 9,816,847 B2
(45) Date of Patent: Nov. 14, 2017

(54) ULTRASONIC FLOWMETER AND METHOD FOR MEASURING FLOW

(71) Applicant: Azbil Corporation, Tokyo (JP)

(72) Inventor: Hiroshi Sasaki, Tokyo (JP)

(73) Assignee: Azbil Corporation, Tokyo (JP)

( * ) Notice: Subject to any disclaimer, the term of this patent is extended or adjusted under 35 U.S.C. 154(b) by 172 days.

(21) Appl. No.: 14/844,745

(22) Filed: Sep. 3, 2015

(65) Prior Publication Data

US 2016/0069731 A1    Mar. 10, 2016

(30) Foreign Application Priority Data

Sep. 5, 2014  (JP) ................................. 2014-181690

(51) Int. Cl.
  *G01F 1/66* (2006.01)
  *G01N 29/024* (2006.01)
  *G01F 25/00* (2006.01)
  *G01F 15/06* (2006.01)

(52) U.S. Cl.
  CPC ............ *G01F 1/667* (2013.01); *G01F 15/063* (2013.01); *G01F 25/0053* (2013.01)

(58) Field of Classification Search
  CPC . G01F 1/66; G01F 1/667; G01N 2291/02836; G01N 2291/102; G01N 29/024
  See application file for complete search history.

(56) References Cited

U.S. PATENT DOCUMENTS

| 4,331,025 | A |   | 5/1982  | Ord, Jr. |
|-----------|---|---|---------|----------|
| 5,705,753 | A | * | 1/1998  | Hastings ................ G01F 1/662 374/E11.01 |
| 5,835,884 | A | * | 11/1998 | Brown ..................... G01F 1/00 702/45 |

(Continued)

FOREIGN PATENT DOCUMENTS

| EP | 1 173 733 B1     | 5/2011  |
| JP | H07-260532 A     | 10/1995 |
| KR | 10-2010-0115562 A | 10/2010 |

OTHER PUBLICATIONS

Japanese Application No. 2014-181690, filed Sep. 5, 2014.

(Continued)

*Primary Examiner* — David A Rogers
(74) *Attorney, Agent, or Firm* — Amster, Rothstein & Ebenstein, LLP

(57) ABSTRACT

An ultrasonic flow meter that includes a first ultrasonic transducer for making incident a first ultrasonic signal against a pipe through which a fluid flows; a second ultrasonic transducer, disposed in a position capable of receiving the first ultrasonic signal, for making incident a second ultrasonic signal against pipe; a flow velocity computation component for computing the flow velocity of the fluid within pipe based on a first time period during which the first ultrasonic signal arrives at the second ultrasonic transducer and on a second time period during which the second ultrasonic signal arrives at the first ultrasonic transducer; a logarithmic correction function saving component for sav- (Continued)

ing a logarithmic correction function; and a logarithmic correction component for correction the flow velocity by using the correction coefficient that corresponds to the Reynolds number of the fluid.

16 Claims, 8 Drawing Sheets

(56) References Cited

U.S. PATENT DOCUMENTS

| | | | |
|---|---|---|---|
| 6,487,916 B1* | 12/2002 | Gomm | G01F 1/667 |
| | | | 73/861.27 |
| 6,634,239 B2* | 10/2003 | Gomm | G01F 1/667 |
| | | | 73/861.27 |
| 6,694,824 B2* | 2/2004 | Shinmura | G01F 1/662 |
| | | | 73/861.29 |
| 7,942,068 B2* | 5/2011 | Ao | G01F 1/667 |
| | | | 702/79 |
| 8,875,587 B2* | 11/2014 | Wiest | G01F 1/662 |
| | | | 73/861.28 |
| 2004/0123666 A1* | 7/2004 | Ao | G01F 1/662 |
| | | | 73/644 |
| 2007/0067116 A1* | 3/2007 | Rothman | G01F 1/363 |
| | | | 702/55 |
| 2009/0000392 A1* | 1/2009 | Zhou | G01F 25/0007 |
| | | | 73/861.18 |
| 2009/0055119 A1* | 2/2009 | Baumoel | G01F 25/0007 |
| | | | 702/100 |
| 2009/0229375 A1* | 9/2009 | Atkinson | G01F 1/34 |
| | | | 73/861.18 |
| 2010/0229654 A1* | 9/2010 | Ao | G01F 1/667 |
| | | | 73/861.31 |
| 2011/0271770 A1* | 11/2011 | Wiest | G01F 1/662 |
| | | | 73/861.28 |
| 2014/0195173 A1* | 7/2014 | Bezdek | G01F 1/66 |
| | | | 702/48 |

OTHER PUBLICATIONS

Hiroshi Sasaki and Tomohito Hayashi, "Development of a Clamp-on Ultrasonic Flowmeter for Gas", Azbil Technical Review, vol. 56, pp. 63-69 (Apr. 2015).
Korean Intellectual Property Office, "Office Action", issued in Korean Patent Application No. 10-2015-0117895 which is a KR counterpart of U.S. Appl. No. 14/844,745, dated Apr. 10, 2017, 4 pages.

* cited by examiner (Fig. 1)
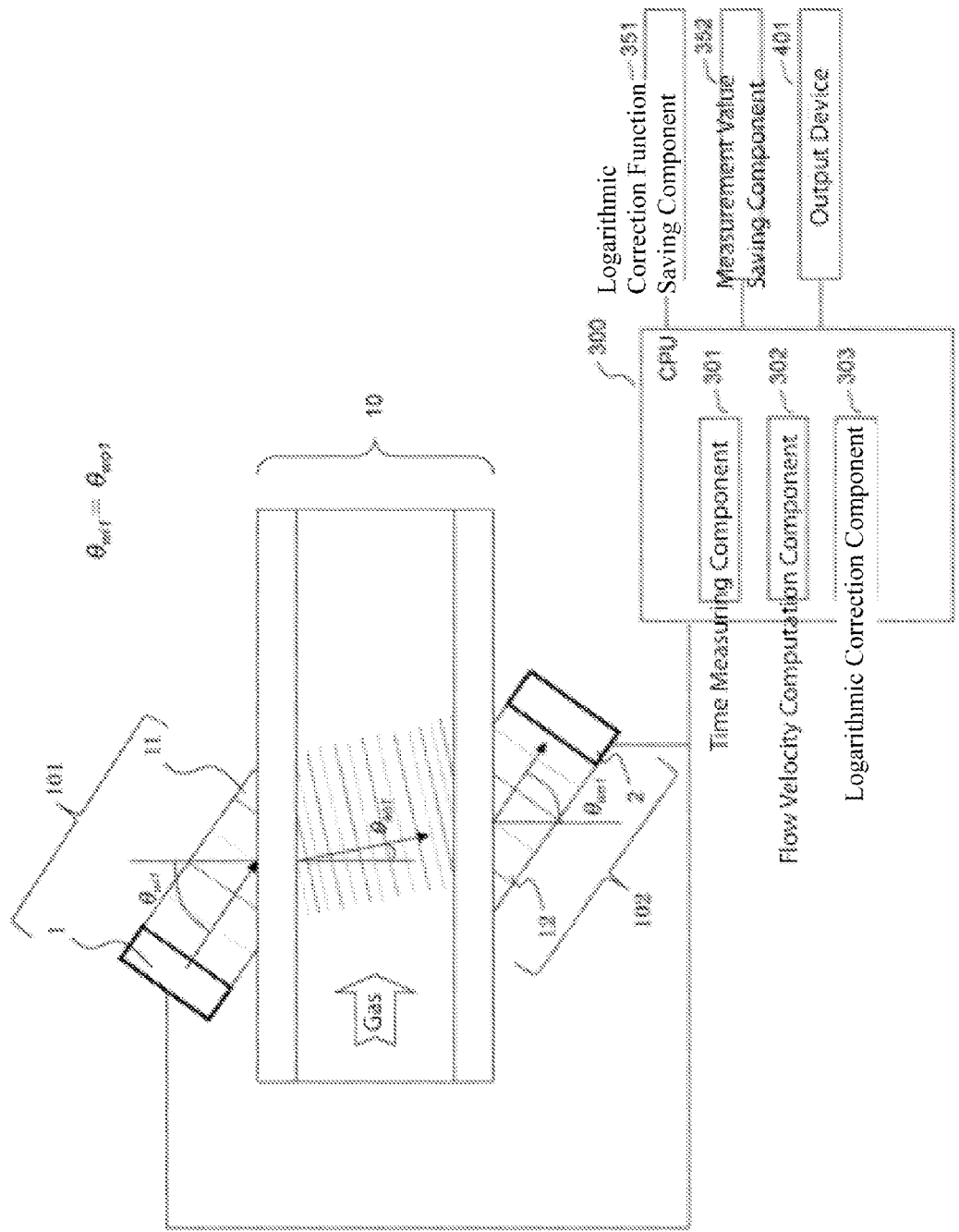

(Fig. 2)
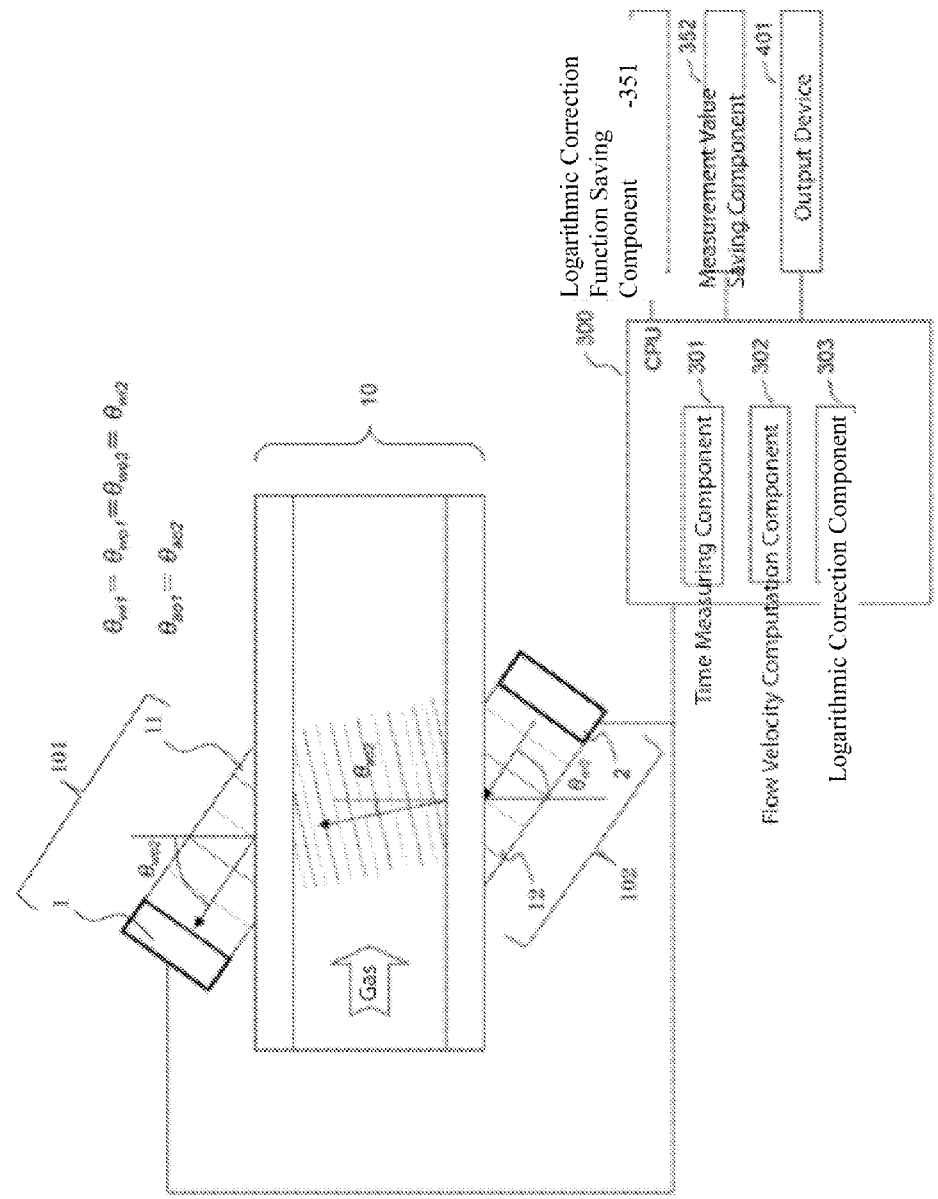

(Fig. 3)
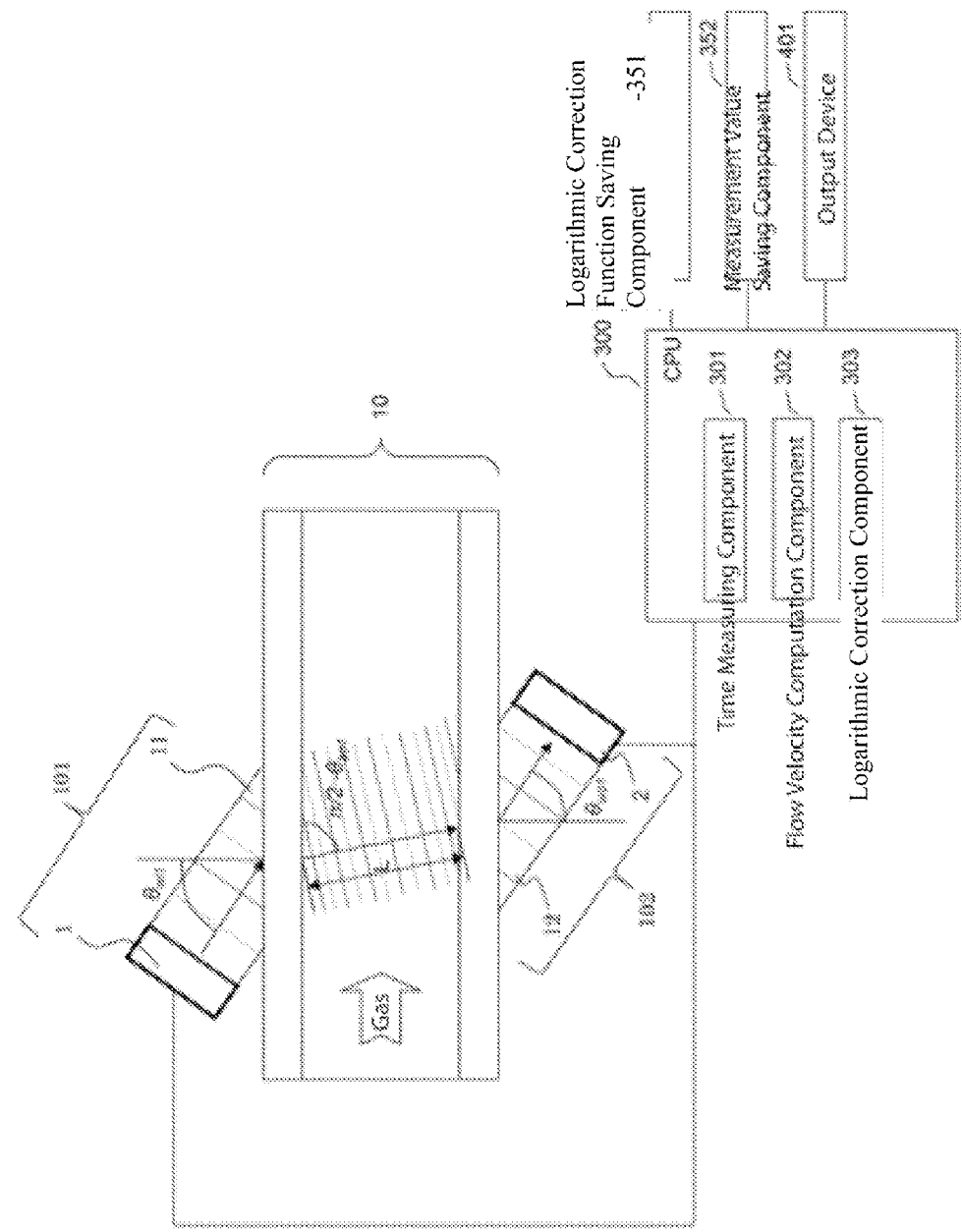

(Fig. 4)
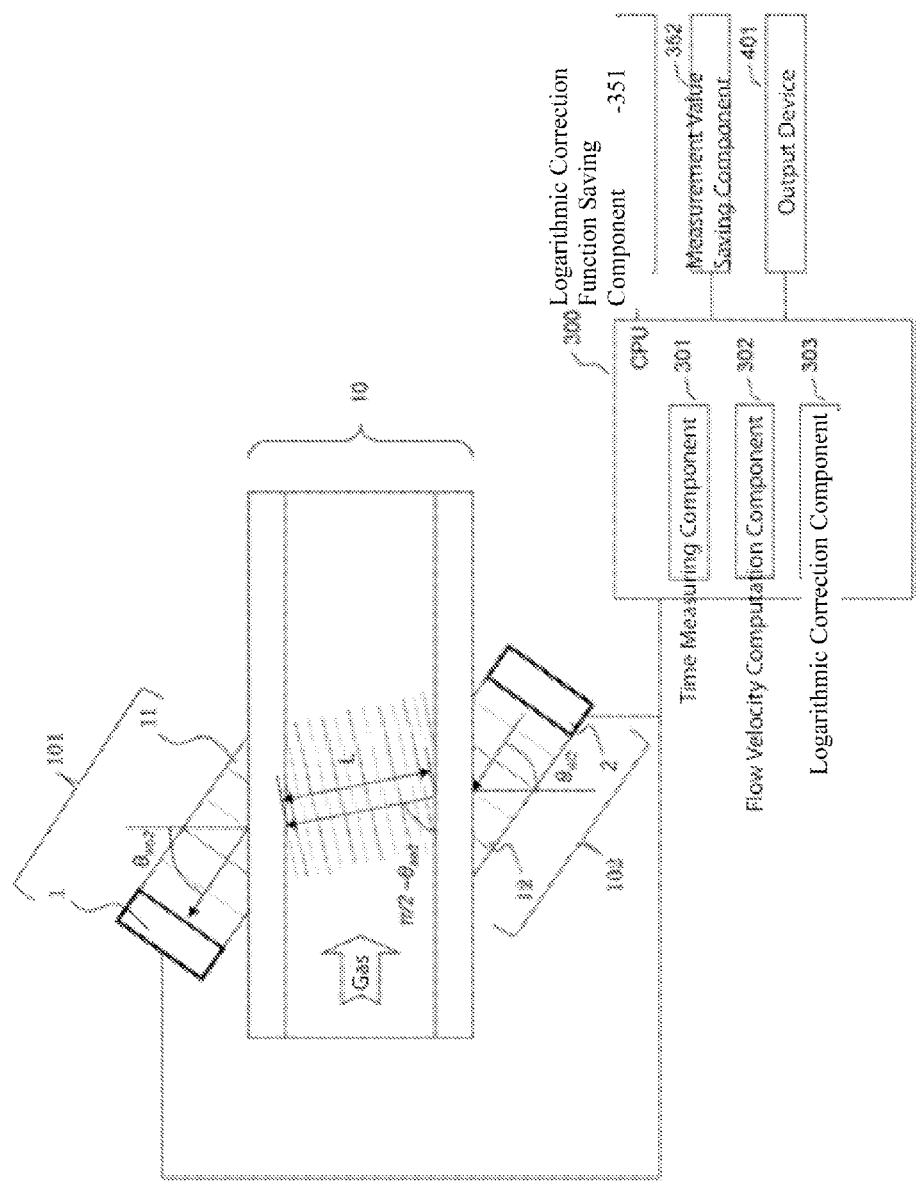

(Fig. 5)
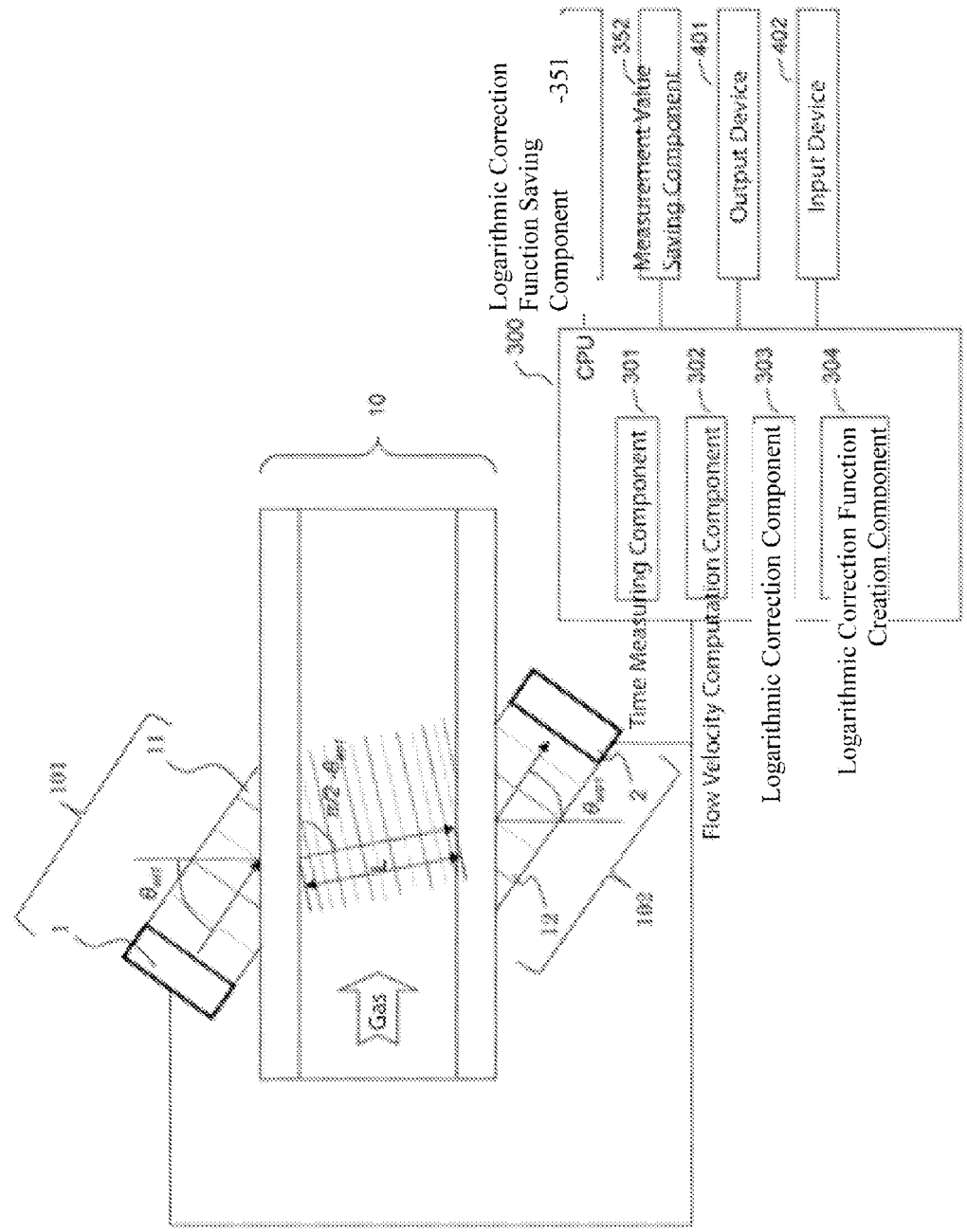

(Fig. 6)
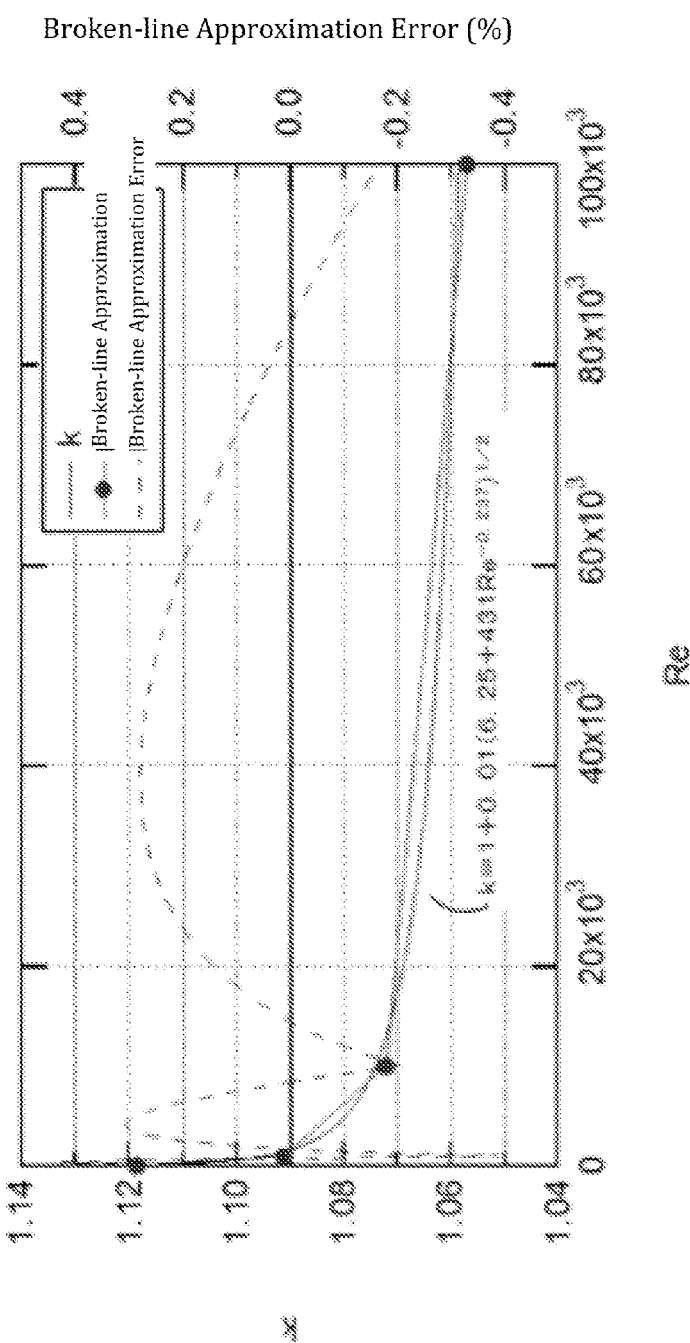

(Fig. 7)
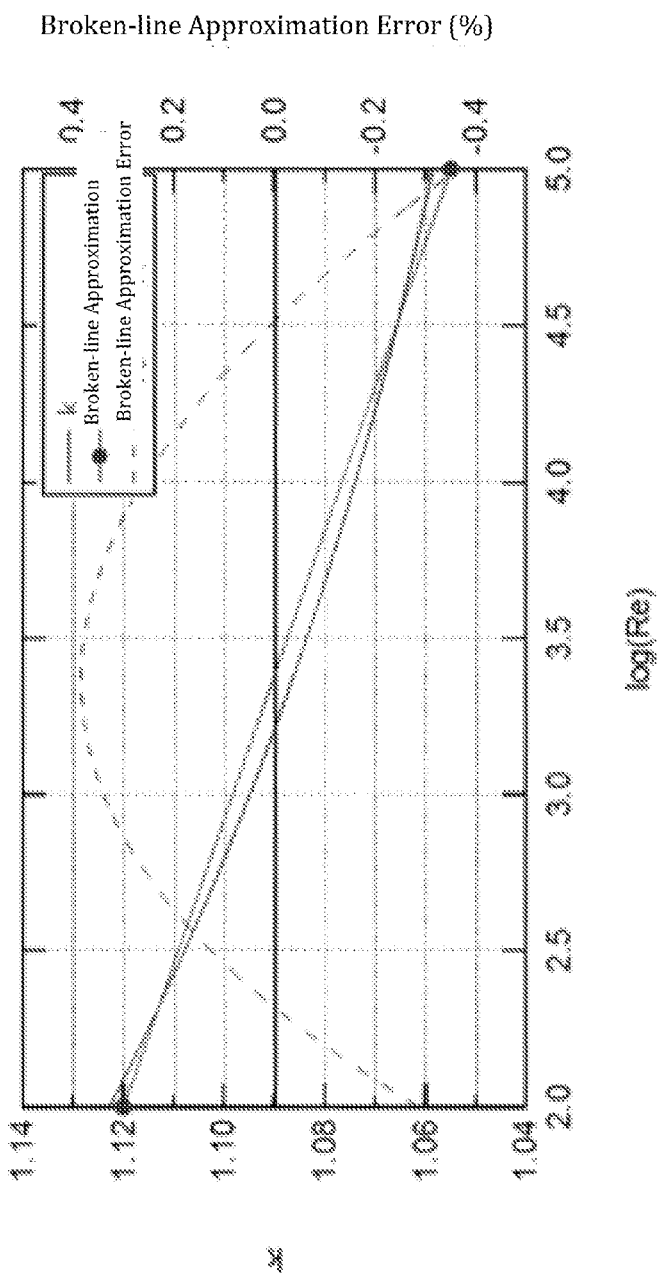

(Fig. 8)
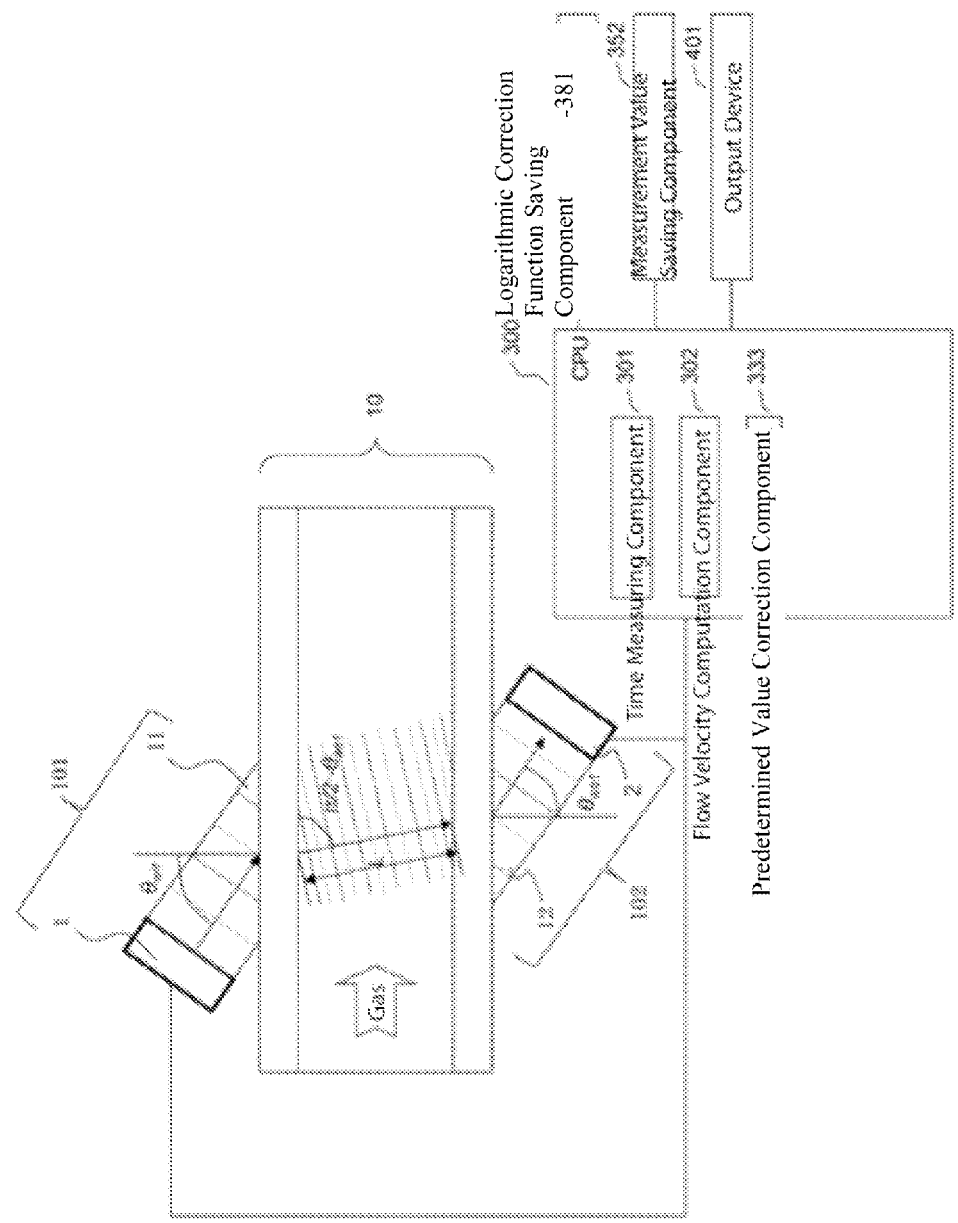

ULTRASONIC FLOWMETER AND METHOD FOR MEASURING FLOW

CROSS-REFERENCE TO RELATED APPLICATION

This application claims the benefit of and priority to Japanese Patent Application No. 2014-181690, filed on Sep. 5, 2014, the entire contents of which are incorporated herein by reference.

TECHNICAL FIELD

This invention relates to fluid measurement technology, and particularly to ultrasonic flow meters and methods for measuring flow.

PRIOR ART

A clamp-on type ultrasonic flow meter comprising ultrasonic wave transducers placed respectively at the upstream side and downstream side of the outside of a pipe. Generally a clamp-on type ultrasonic flow meter uses ultrasonic waves, and therefore hereafter in this Detailed Description, a "clamp-on type ultrasonic flow meter" may sometimes be abbreviated simply to "clamp-on flow meter." A clamp-on flow meter sends ultrasonic waves into a fluid flowing through a pipe and computes the flow velocity and flow volume of the fluid flowing through the pipe based on the propagation time of the ultrasonic waves that propagate while following from the upstream to the downstream direction of the fluid, and the propagation time of the ultrasonic waves that propagate while opposing from the downstream to the upstream direction. (For examples, see Patent References 1 and 2.) A clamp-on flow meter will operate if the ultrasonic transducers are pressed against the outside of the pipe, so there is no need to sever the pipe at time of placement, and it does not contact the fluid flowing through the empty cavity within the pipe, so there are various advantages such as ability to use even if the measurement target fluid is corrosive, not impacting the purity of the measurement target fluid, and, because a structure component is not inserted to within the pipe, not inducing a loss in pressure.

PRIOR ART REFERENCES

Patent References

Patent Reference 1: European Patent 1173733, Detailed Description

Patent Reference 2: Japanese Published Unexamined Patent Application H07-260532

SUMMARY OF THE INVENTION

Problem the Invention Seeks to Solve

This invention has as one objective: the provision of an ultrasonic flow meter and a method for measuring flow that are capable of accurately measuring the flow of a fluid. Here, the use of the word fluid includes gas and liquids.

Means of Solving the Problem

According to a mode of the invention, an ultrasonic flow meter is offered that comprises: (a) a first ultrasonic transducer for making incident a first ultrasonic signal against a pipe through which a fluid flows; (b) a second ultrasonic transducer, disposed in a position capable of receiving the first ultrasonic signal, for making incident a second ultrasonic signal against the pipe; (c) a flow velocity computation component for computing the flow velocity of the fluid within the pipe based on a first time period during which the first ultrasonic signal passes through the pipe and arrives at the second ultrasonic transducer and on a second time period during which the second ultrasonic signal passes through the pipe and arrives at the first ultrasonic transducer; (d) a logarithmic correction function saving component for saving a logarithmic correction function that has performed broken-line approximation of the relationship between the logarithm of the Reynolds number and the correction coefficient for the flow velocity; and (e) a logarithmic correction component for correcting the flow velocity by using a correction coefficient that corresponds to the logarithm of the Reynolds number of the fluid.

According to a mode of the invention, a method is offered for measuring flow that includes: (a) making incident a first ultrasonic signal from a first ultrasonic transducer against a pipe through which a fluid flows; (b) making incident a second ultrasonic signal from a second ultrasonic transducer, disposed in a position capable of receiving the first ultrasonic signal, against the pipe; (c) computing the flow velocity of the fluid within the pipe based on a first time period during which the first ultrasonic signal passes through the pipe and arrives at the second ultrasonic transducer and on a second time period during which the second ultrasonic signal passes through the pipe and arrives at the first ultrasonic transducer; (d) preparing a logarithmic correction function that performs broken-line approximation of the relationship between the logarithm of the Reynolds number and the correction coefficient for the flow velocity; and (e) correcting the flow velocity by using a correction coefficient that corresponds to the logarithm of the Reynolds number of the fluid.

According to a mode of the invention, an ultrasonic flow meter is offered that provides: (a) a first ultrasonic transducer for making incident a first ultrasonic signal against a pipe through which a fluid flows; (b) a second ultrasonic transducer, disposed in a position capable of receiving the first ultrasonic signal, for making incident a second ultrasonic signal against the pipe; (c) a flow velocity computation component for computing the flow velocity of the fluid within the pipe based on a first time by which the first ultrasonic signal passes through the pipe and arrives at the second ultrasonic transducer and on a second time by which the second ultrasonic signal passes through the pipe and arrives at the first ultrasonic transducer; and (d) a predetermined value correction component for correcting the flow velocity by using the correction coefficient of a first predetermined value when the fluid is considered to be laminar flow and for correcting the flow velocity by using the correction coefficient of a second predetermined value when the fluid is considered to be turbulent flow.

According to a mode of the invention, a method for measuring flow is offered that includes: (a) making incident a first ultrasonic signal from a first ultrasonic transducer against a pipe through which a fluid flows; (b) making incident a second ultrasonic signal from a second ultrasonic transducer, disposed in a position capable of receiving the first ultrasonic signal, against the pipe; (c) computing the flow velocity of the fluid within the pipe based on a first time period during which the first ultrasonic signal passes through the pipe and arrives at the second ultrasonic transducer and on a second time period during which the second ultrasonic signal passes through the pipe and arrives at the first ultrasonic transducer; and (d) correcting the flow velocity by using the correction coefficient of a first predetermined value when the fluid is considered to be laminar flow and for correcting the flow velocity by using the correction coefficient of a second predetermined value when the fluid is considered to be turbulent flow.

Effect of the Invention

Based on this invention it is possible to provide an ultrasonic flow meter and method for measuring flow that is capable of accurately measuring the flow of a fluid.

BRIEF DESCRIPTION OF THE DRAWINGS

FIG. 1 is a typical cross section drawing of a clamp-on flow meter according to the first implementation mode of this invention.

FIG. 2 is a typical cross section drawing of a clamp-on flow meter according to the first implementation mode of this invention.

FIG. 3 is a typical cross section drawing of a clamp-on flow meter according to the first implementation mode of this invention.

FIG. 4 is a typical cross section drawing of a clamp-on flow meter according to the first implementation mode of this invention.

FIG. 5 is a typical cross section drawing of a clamp-on flow meter according to the second implementation mode of this invention.

FIG. 6 is a graph that shows the relationship between Reynolds number Re and correction coefficient k according to a reference example for the first and second implementation modes of this invention.

FIG. 7 is a graph that shows the relationship between the logarithm log (Re) of the Reynolds number and correction coefficient k according to a working example for the first and second implementation modes of this invention.

FIG. 8 is a typical cross section drawing of a clamp-on flow meter according to the third implementation mode of this invention.

MODES OF IMPLEMENTING THE INVENTION

The following section describes the modes of implementing this invention. In the drawings described below, identical or similar components are expressed by identical or similar symbols. Accordingly, the exact dimensions should be determined by comparison to the following explanations. In addition, it is a matter of course that there are included some components that will differ in the relationships and ratios between each other in the drawings.
(First Implementation Mode)

The clamp-on ultrasonic flow meter according to the first implementation mode, as shown in FIG. 1 and FIG. 2, provides a first ultrasonic transducer 101 for making obliquely incident a first ultrasonic signal at angle $\theta_{wi1}$ against pipe 10 through which a fluid flows, and a second ultrasonic transducer 102, disposed in a position capable of receiving the first ultrasonic signal, for making obliquely incident a second ultrasonic signal at angle $\theta_{wi2}$, which is at the same angle of incidence as $\theta_{wi1}$, against pipe 10. Here, the use of the word fluid includes gas and liquids, but the following explanation presumes a gas.

First ultrasonic transducer 101 is disposed at the upstream side of the fluid flowing through pipe 10, and second ultrasonic transducer 102 is disposed at the downstream side. The first ultrasonic signal emitted from first ultrasonic transducer 101 passes through pipe 10 and is received by second ultrasonic transducer 102. The second ultrasonic signal, emitted from second first ultrasonic transducer 102, passes through pipe 10 and is received by first ultrasonic transducer 101. For example, first ultrasonic transducer 101 and second ultrasonic transducer 102 may alternately emit the ultrasonic signals by having a drive signal alternately applied.

First ultrasonic transducer 101 and second ultrasonic transducer 102 are electrically connected to central processing unit (CPU) 300. CPU 300 includes time measuring component 301 for measuring the first time period during which the first ultrasonic signal is emitted from first ultrasonic transducer 101, passes through pipe 10 and arrives at second ultrasonic transducer 102, and the second time period during which the second ultrasonic signal is emitted from second ultrasonic transducer 102, passes through pipe 10 and arrives at first ultrasonic transducer 101, and includes flow velocity computation component 302 for computing the flow velocity of the fluid within pipe 10 based on the first time period and the second time period.

Logarithmic correction function saving component 351 for saving the logarithmic correction coefficient that performs a broken-line approximation of the relationship between the logarithm of the Reynolds number and the correction function of the flow velocity is connected to CPU 300. It is possible to use a memory or similar device as logarithmic correction coefficient saving component 351. CPU 300 additionally provides logarithmic correction component 303 for correcting the flow velocity through use of a correction coefficient that corresponds to the logarithm of the Reynolds number of the fluid within pipe 10.

First ultrasonic transducer 101 comprises, for example, first oscillator 1 for emitting the first ultrasonic signal, and first wedge 11 disposed on the outer surface of pipe 10 so as to make obliquely incident the first ultrasonic signal against pipe 10 at angle $\theta_{wi1}$. Similarly, second ultrasonic transducer 102 comprises, for example, second oscillator 2 for emitting the second ultrasonic signal, and second wedge 12 disposed on the outer surface of pipe 10 so as to make obliquely incident the second ultrasonic signal against pipe 10 at angle $\theta_{wi2}$. Pipe 10 is, for example, a metal pipe constituted of a metal material such as stainless steel. First and second wedges 11 and 12 are, for example, constituted of a synthetic resin such as a plastic such as polyetherimide.

Based on Snell's law, the following Equation (1) is fulfilled when $c_W$ is the acoustic velocity of the ultrasonic wave in first wedge 11 of first ultrasonic transducer 101, when $c_a$ is the acoustic velocity of the ultrasonic wave in the fluid within pipe 10, when $\theta_{wi1}$ is the angle of incidence of the first ultrasonic signal relative to the interface between first wedge 11 and pipe 10, and when $\theta_{ao1}$ is the angle of emission of the first ultrasonic signal which is emitted to the fluid within pipe 10.

$$\sin(\theta_{wi1})/c_W = \sin(\theta_{ao1})/c_a \qquad \text{Equation (1):}$$

Therefore, $\theta_{ao1}$, which is the angle of emission of the first ultrasonic signal emitted from first ultrasonic transducer 101 and is emitted to the fluid within pipe 10, can be given by following Equation (2).

$$\theta_{ao1} = \sin(\sin \theta_{wi1} \cdot c_a/c_W) \qquad \text{Equation (2):}$$

The first ultrasonic signal advances through the fluid within pipe 10 and is made incident on the section that opposes the section of the wall of pipe 10 from which it has been emitted. Furthermore, the first ultrasonic signal is emitted from the wall of pipe 10 to the pipe exterior at angle $\theta_{wo1}$, which is identical to $\theta_{wi1}$, and is received by second ultrasonic transducer 102.

Based on Snell's law, the following Equation (3) is fulfilled when $c_W$ is the acoustic velocity of the ultrasonic wave in second wedge 12 of second ultrasonic transducer 102, when $\theta_{wi2}$ is the angle of incidence of the second ultrasonic signal relative to the interface between second wedge 12 and pipe 10, and when $\theta_{ao2}$ is the angle of emission of the second ultrasonic signal which is emitted to the fluid within pipe 10.

$$\sin(\theta_{Wi2})/c_W = \sin(\theta_{ao2})/c_a \qquad \text{Equation (3):}$$

Therefore, $\theta_{ao2}$, which is the angle of emission of the second ultrasonic signal emitted from second ultrasonic transducer 102 and is emitted to the fluid within pipe 10, can be given by following Equation (4).

$$\theta_{ao2} = \sin^{-1}(\sin\theta_{Wi2} \cdot c_a/c_W) \qquad \text{Equation (4):}$$

The second ultrasonic signal advances through the fluid within pipe 10 and is made incident on the section that opposes the section of the wall of pipe 10 from which it has been emitted. Furthermore, the second ultrasonic signal is emitted from the wall of pipe 10 to the pipe exterior at angle $\theta_{wo2}$, which is identical to $\theta_{wi2}$, and is received by first ultrasonic transducer 101.

The fluid flows within the interior of pipe 10 at flow velocity v. As explained above, first ultrasonic transducer 101 is disposed at the upstream side of the fluid flowing through pipe 10, and second ultrasonic transducer 102 is disposed on the downstream side. Therefore, the first ultrasonic signal emitted from first ultrasonic transducer 101 propagates through the cavity of pipe 10 while following the flow of the fluid. In comparison, the second ultrasonic signal emitted from second ultrasonic transducer 102 propagates through the cavity of pipe 10 while opposing the flow of the fluid. Thus, within the cavity of pipe 10, a difference in the propagation time for the first ultrasonic signal and the propagation time for the second ultrasonic signal is generated due to flow velocity v of the fluid.

Because the first ultrasonic signal crosses the cavity of pipe 10, required propagation time $t_1$ can be given by following Equation (5).

$$t_1 = L/(c_a + v \cdot \cos((\pi/2) - \theta_{ao1})) \qquad \text{Equation (5):}$$

In addition, because the second ultrasonic signal crosses the cavity of pipe 10, required propagation time $t_2$ can be given by following Equation (6).

$$t_2 = L/(c_a - v \cdot \cos((\pi/2) - \theta_{ao2})) \qquad \text{Equation (6):}$$

Here, as shown in FIG. 3 and FIG. 4, L expresses the length of crossing the cavity of pipe 10 for the first ultrasonic signal and the second ultrasonic signal, respectively.
In addition, $\theta_{ao2}$ is equivalent to $\theta_{ao1}$, and therefore the following Equation (7) can be obtained from above Equation (6).

$$t_2 = L/(c_a - v \cdot \cos((\pi/2) - \theta_{ao1})) \qquad \text{Equation (7):}$$

From the above Equation (5) and Equation (7), difference $\Delta t$ between propagation time $t_2$ and propagation time $t_1$ can be given by following Equation (8).

$$\Delta t_1 = t_2 - t_1 \approx (2L_v \cdot \sin\theta_{ao1})/c_a^2 \qquad \text{Equation (8):}$$

From the above Equation (8), flow velocity v of the fluid flowing through the cavity of pipe 10 can be given by following Equation (9).

$$v = c_a^2 \Delta t/(2L \cdot \sin\theta_{ao1}) \qquad \text{Equation (9):}$$

Here, angle of emission $\theta_{ao1}$ can be computed by above Equation (2). Length L can be computed from the diameter of pipe 10 and angle of emission $\theta_{ao1}$. In addition, acoustic velocity $c_a$ for the fluid flowing through the cavity of pipe 10 is a constant governed by the type of fluid and the temperature. Accordingly, by measuring $\Delta t$, the difference between the propagation times for the first and ultrasonic signals, it is possible to compute flow velocity v for the fluid flowing through the cavity of pipe 10.

Time measuring component 301 shown in FIG. 1 through FIG. 4 measures a first time period, during which the first ultrasonic signal is emitted from first ultrasonic transducer 101 and passes through pipe 10 and arrives at second ultrasonic transducer 102, by monitoring the timing at which first ultrasonic transducer 101 has emitted the first ultrasonic signal and the timing at which second ultrasonic transducer 102 has received the first ultrasonic signal. In addition, time measuring component 301 measures a second time period, during which the second ultrasonic signal is emitted from second ultrasonic transducer 102 and passes through pipe 10 and arrives at first ultrasonic transducer 101, by monitoring the timing at which second ultrasonic transducer 102 has emitted the second ultrasonic signal and the timing at which first ultrasonic transducer 101 has received the second ultrasonic signal.

Time measuring component 301 computes the value of the difference between the second time period and the first time period, and it transmits the value to flow velocity computation component 302. However, it is also acceptable for time measuring component 301 to directly measure the difference between the second time period and the first time period. In this case, a difference between the propagation time for the first ultrasonic signal and the propagation time for the second ultrasonic signal is not generated at first and second wedges 11 and 12 and at the interior wall of pipe 10. Accordingly, the difference between the second time period and the first time period is generated based only on $\Delta t$, the difference between propagation time $t_2$ and propagation time $t_1$ within the cavity of pipe 10 and given by above Equation (8).

Flow velocity computation component 302, for example, computes the value of angle of emission $\theta_{ao1}$ of the first ultrasonic signal emitted to the cavity of pipe 10 from the pipe wall, based on above Equation (2).

Flow velocity computation component 302 computes flow velocity v for the fluid flowing through the cavity of pipe 10 by substituting the value computed by the variable at the right side of above Equation (9). Furthermore, it is acceptable for flow velocity computation component 302 to compute flow velocity v based on the difference between the inverse of the first time period and the inverse of the second time period.

In this case, the fluid within pipe 10 possesses a flow velocity distribution at a cross section of pipe 10, and, generally, the vicinity of the center of cross section of pipe 10 has a faster flow velocity than the vicinity of the inner wall of pipe 10. Because the first and second ultrasonic signals are in beam form and cross the fluid within pipe 10 in linear fashion, flow velocity v to be computed based on above Equation (9) is the average velocity of the fluid from one end to the other end of the locus of the linear form by which the first and second ultrasonic signals have crossed the fluid within pipe 10.

Accordingly, the average flow velocity at a cross section of pipe 10 can be found by multiplying a correction coefficient by flow velocity v computed based on above Equation (9). Specifically, the average flow velocity at a cross section of pipe 10 is computed through correcting by dividing fluid flow velocity v computed based on above Equation (9) by a correction coefficient larger than 1, or by multiplying a correction coefficient larger than 1 by fluid flow velocity v computed based on above Equation (9). As is also noted in appendix C of the Japanese Industrial Standard (JIS) B 7556:2008 "Procedures of Calibration and Testing for Gas Flowmeter," correction coefficient k can be given as a function of the Reynolds number Re for the fluid, as shown in following Equation (10).

$$k=f(Re) \qquad \text{Equation (10):}$$

The function that provides correction coefficient k can also be expressed as a continuous curve. However, when the length of a straight pipe at the upstream side of the position at which flow velocity v is measured is short, or when a pipe connection condition exists such as an inserted rectifier, it may not be realistic to theoretically seek a curvilinear non-linear function to obtain correction coefficient k. Additionally, correction coefficient k may fluctuate according to surface conditions for the inner wall of the pipe. For this reason, by using a multiplicity of fluids which differ in Reynolds number Re, by taking actual measurements of correction coefficient k expected to be used in an ultrasonic flow meter, and by forming a straight line by linking the points that show the combinations of the obtained values, a correction coefficient that performs a broken-line approximation of the relationship between the logarithm of the Reynolds number and the correction function of the flow velocity can be used in an ultrasonic flow meter.

However, an ultrasonic flow meter can have a large ratio of measurable minimum flow to maximum flow (rangeability), and the Reynolds number Re for the measurement target fluid may span a wide range. For that reason, when performing broken-line approximation of correction coefficient k relative to Reynolds number Re, there may at times arise the necessity to obtain several actual values to give points for linking the broken-line line.

Here, correction coefficient k in many cases linearly changes relative to the logarithm log (Re) of the Reynolds number rather than relative to the Reynolds number Re itself. The base of the logarithm is 10, for example, but it is discretionary with no limitation to this, and it may be also Napier's constant (e) or a similar number. The points needed to perform broken-line approximation of a linear change are fewer than the points needed to perform broken-line approximation of a curvilinear change. Therefore, by performing broken-line approximation of correction coefficient k relative to logarithm log (Re) of the Reynolds number rather than performing broken-line approximation of correction coefficient k relative to the Reynolds number Re itself, it is possible to reduce the number of points needed for broken-line approximation while maintaining accuracy.

Therefore, the ultrasonic flow meter according to the first implementation mode saves, within logarithmic correction function saving component 351, the logarithmic correction function that has performed broken-line approximation of the relationship between logarithm log (Re) of the Reynolds number and correction coefficient k for flow velocity. In this way, it is possible to reduce the required memory capacity in logarithmic correction function storage component 351 in comparison with saving a correction function that has performed broken-line approximation of the relationship between Reynolds number Re and correction coefficient k for flow velocity.

Reynolds number Re, generally, is a dimensionless number obtained by dividing the product of representative length and the flow velocity by the kinematic viscosity. Logarithmic correction component 303 computes the value of Reynolds number Re for the fluid flowing through pipe 10 by using the value of flow velocity v computed by flow velocity computation component 302 and the known value of the viscosity of the fluid. Furthermore, it is acceptable to seek the viscosity of the fluid by measuring the temperature and pressure of the fluid flowing through pipe 10. Moreover, logarithmic correction component 303 reads out the logarithmic correction function from logarithmic correction function saving component 351 and computes the value of correction coefficient k to correspond to the value logarithm log (Re) of the Reynolds number for the fluid within pipe 10.

When correction coefficient k is set to be larger than 1, logarithmic correction component 303 corrects by dividing the value of flow velocity v computed with flow velocity computation component 302 by correction coefficient k, and computes the average flow velocity $v_c$ at a cross section of pipe 10. When correction coefficient k is set to be smaller than 1, logarithmic correction component 303 performs correction by multiplying the value of flow velocity v computed with flow velocity computation component 302 by correction coefficient k, and computes the average flow velocity at a cross section of pipe 10.

When the correction coefficient is set to be larger than 1, it is also acceptable for logarithmic correction component 303 to compute flow q for the fluid flowing through the cavity of pipe 10 using the following Equation (11).

$$q=S(1/k)v \qquad \text{Equation (11):}$$

When the correction coefficient is set to be smaller than 1, it is also acceptable for logarithmic correction component 303 to compute flow q for the fluid flowing through the cavity of pipe 10 using the following Equation (12).

$$q=Skv \qquad \text{Equation (12):}$$

In the above Equation (11) and Equation (12), S expresses the cross section surface area of pipe 10. By using D for the inner diameter of pipe 10, there results:

$$L=D/\cos(\theta_{ao1})$$

$$S=\pi D^2/4$$

and therefore, from Equation (9) and Equation (11), it is also acceptable to express flow q of the fluid as in the following Equation (13).

$$q=\pi(1/k)Dc_a^2\Delta t/(8\cdot\tan\theta_{ao1}) \qquad \text{Equation (13):}$$

Alternatively, based on Equation (9) and Equation (12), it is also acceptable to express flow q of the fluid as in following Equation (14).

$$q=\pi k Dc_a^2\Delta t/(8\cdot\tan\theta_{ao1}) \qquad \text{Equation (14):}$$

Measurement value saving component 352 and output device 401 are connected to CPU 300. Logarithmic correction component 303 saves computed fluid flow q and corrected flow velocity $v_c$ to measurement value saving component 352 and outputs them to output device 401.

(Second Implementation Mode)

The ultrasonic flow meter according to the second implementation mode, shown in FIG. 5, further provides an input device 402 and a logarithmic correction function creation component 304. The other structural elements of the ultrasonic flow meter according to the second implementation mode are identical to those of the first implementation mode. Input device 402 receives input of a multiplicity of combinations (Re, k) of the value of Reynolds number Re and the value of correction coefficient k. A multiplicity of combinations (Re, k) of the value of Reynolds number Re and the value of correction coefficient k are obtained by actual measurement, for example, by flowing fluids possessing a multiplicity of differing Reynolds number Re through pipe 10.

From a multiplicity of combinations (Re, k) of the value of Reynolds number Re and the value of correction coefficient k received from input device 402, logarithmic correction function creation component 304 included in CPU 300 creates a multiplicity of combinations (log (Re), k) of the value of the logarithm log (Re) of the Reynolds number and the value of correction coefficient k. Furthermore, logarithmic correction function creation component 304 joins the broken line by plotting a multiplicity of combinations (log (Re), k) of the value of the logarithm log (Re) of the Reynolds number and the value of correction coefficient k and creates a logarithmic correction function that performs broken-line approximation of the relationship between the logarithm log (Re) of the Reynolds number and correction coefficient k of flow velocity. Logarithmic correction function creation component 304 saves the created logarithmic correction function in logarithmic correction function saving component 351.

Furthermore, it is acceptable for input device 402 to receive input of a multiplicity of combinations (log (Re), k) of the value of the logarithm log (Re) of the Reynolds number and the value of correction coefficient k. In this case, logarithmic correction function creation component 304 joins the broken line by plotting a multiplicity of combinations (log (Re), k) of the value of the logarithm log (Re) of the Reynolds number and the value of correction coefficient k received from input device 402, and it creates a logarithmic correction function that performs broken-line approximation of the relationship between the logarithm log (Re) of the Reynolds number and correction coefficient k of flow velocity.

Working Example of the First and Second Implementation Modes

The number of points needed to perform broken-line approximation to an accuracy within plus or minus 0.5% for the original correction coefficient k, with Reynolds number Re within a range of 100 to 100,000 was verified. First, the following Equation (15) was prepared as a curvilinear nonlinear correction function.

$$k = 1 + 0.01(6.25 + 431 Re^{-0.237})^{1/2}$$ Equation (15):

In order to perform broken-line approximation of the correction function given by Equation (15) to an accuracy within plus or minus 0.5%, it was necessary to plot 4 points at which the Reynolds number Re was 100, 1,000, 10,000, and 100,000, as shown in FIG. 6.

Conversely, with a graph that places the logarithm log 10 (Re) of the Reynolds number on the horizontal axis and places the correction coefficient k on the vertical axis, in order to perform broken-line approximation of the correction function given by Equation (15) to an accuracy within plus or minus 0.5%, it was necessary to plot 2 points at which the Reynolds number Re was 100 and 100,000, as shown in FIG. 7.

From the above results, it was demonstrated that performing broken-line approximation using a graph with Reynolds number logarithm log (Re) on the horizontal axis and correction coefficient k on the vertical axis required fewer points on the graph than performing broken-line approximation using a graph with Reynolds number Re on the horizontal axis and correction coefficient k on the vertical axis. This shows that the curvilinear nonlinear correction function as given by Equation (15) is unknown, and so also in the case of obtaining by actual measurement a multiplicity of combinations (log (Re), k) of the value of the logarithm log (Re) of the Reynolds number and the value of correction coefficient k, creating a logarithmic correction function that performed a broken-line approximation of the relationship between the logarithm log (Re) of the Reynolds number and correction coefficient k of flow velocity reduces the number of combinations (Re, k) of values for Reynolds number Re and values for correction coefficient k needed to be obtained by actual measurement compared with creating a correction function that performs broken-line approximation of the relationship of Reynolds number (Re) and correction coefficient k of flow velocity.

(Third Implementation Mode)

In comparison to the clamp-on ultrasonic flow meter according to the first implementation mode shown in FIG. 1 that provided logarithmic correction component 303 and logarithmic correction function saving component 351, the ultrasonic flow meter of the third implementation mode shown in FIG. 8 provides predetermined value correction component 333 and correction function saving component 381. The other structural elements of the ultrasonic flow meter according to the third implementation mode are identical to those of the first implementation mode.

Correction function saving component 381, which is connected to CPU 300, saves the correction function that has performed broken-line approximation of the relationship between Reynolds number Re and correction coefficient k of flow velocity. Furthermore, it is acceptable for correction function saving component 381 to save the correction function that has performed broken-line approximation of the relationship between logarithm log (Re) of the Reynolds number and correction coefficient k of flow velocity. The method of approximation is discretionary, and it is acceptable to not perform broken-line approximation. Any one of these acceptable conditions is referred to as the correction function in the third implementation mode.

In the case of a transition region wherein the fluid flowing through pipe 10 is between a laminar flow and a turbulent flow, predetermined value correction component 333 reads out the correction function saved in correction function saving component 381, computes correction coefficient k based on the correction function and the Reynolds number Re for the fluid flowing through pipe 10, and corrects flow velocity v that has been computed by flow velocity computation component 302.

Furthermore, predetermined value correction component 333 corrects flow velocity v using a correction coefficient k of a first predetermined value when the fluid in pipe 10 is considered laminar, and it corrects flow velocity v using a correction coefficient k of a second predetermined value when the fluid is considered turbulent.

For example, when straight pipe sections are sufficiently long at both the upstream side and downstream side from the section at which the ultrasonic flow meter is placed on pipe 10 and pipe 10 is an ideally round pipe, the Reynolds number Re of the fluid flowing through pipe 10 is sufficiently small, and the fluid can be considered laminar, then correction coefficient k used to divide flow velocity v will ideally converge to 4/3 (approximately 1.3). Furthermore, the correction coefficient used to multiply flow velocity v will converge to 3/4.

When the upstream side and downstream side from the section at which the ultrasonic flow meter is placed on pipe 10 is bent rather than straight, or when the cross section of the cavity of pipe 10 is not an ideal round shape, the value at which correction coefficient k converges when the Reynolds number Re of the fluid flowing through pipe 10 is small may differ from the ideal value, but it will converge to a fixed value.

For this reason, when the fluid is considered to be laminar, predetermined value use correction component 333 does not compute correction coefficient k based on the Reynolds number Re of the fluid and on a correction function saved in correction function saving component 381, but instead corrects flow velocity v using a correction coefficient k of a first predetermined value for when the fluid is laminar that has been found in advance. With the third implementation mode, the first predetermined value is, for example, a value at which correction coefficient k converges when the Reynolds number Re of the fluid flowing through pipe 10 is sufficiently small.

In addition, for example, when straight pipe sections are sufficiently long at both the upstream side and downstream side from the section at which the ultrasonic flow meter is placed on pipe 10, pipe 10 is an ideally round pipe, the Reynolds number Re of the fluid flowing through pipe 10 is sufficiently large, and the fluid can be considered turbulent, then correction coefficient k will ideally converge to 1.

When a bent pipe rather than a straight pipe at the upstream side and downstream side from the section at which the ultrasonic flow meter is placed on pipe 10, or when the cross section of the cavity of pipe 10 is not an ideal round shape, the value at which correction coefficient k converges when the Reynolds number Re of the fluid flowing through pipe 10 is large may differ from the ideal value, but it will converge to a fixed value.

For this reason, when the fluid in considered to be turbulent, predetermined value correction component 333 does not calculate correction coefficient k based on the Reynolds number Re of the fluid and on a correction function saved in correction function saving component 381, but instead corrections flow velocity v using a correction coefficient k of a second predetermined value for when the fluid is turbulent that has been found in advance. With the third implementation mode, the second predetermined value is, for example, a value at which correction coefficient k converges when the Reynolds number Re of the fluid flowing through pipe 10 is sufficiently large.

According to the ultrasonic flow meter according to the third implementation mode, when the fluid is considered laminar or turbulent, it is possible to omit computing a correction coefficient k based on the Reynolds number Re of the fluid and on a correction function saved in correction function saving component 381.

Modified Example of the Third Implementation Mode

For the correction function saved in correction function saving component 381 shown in FIG. 8, it is acceptable to perform broken-line approximation of the relationship between Reynolds number Re and correction coefficient k of the fluid within a predetermined range for Reynolds number Re. Alternatively, for the correction function, it is acceptable to perform broken-line approximation of the relationship between the logarithm log (Re) of the Reynolds number and correction coefficient k of the fluid within a set range for Reynolds number Re.

In this case, when the Reynolds number Re of the fluid flowing within pipe 10 is smaller than the range for Reynolds number Re that regulates the correction function saved in correction function saving component 381, predetermined value correction component 333 corrects flow velocity v using a correction coefficient k that corresponds to the minimum value for Reynolds number Re that regulates the correction function, and when the Reynolds number Re of the fluid flowing within pipe 10 is larger than the range for Reynolds number Re that regulates the correction function saved in correction function saving component 381, predetermined value correction component 333 corrects flow velocity v using a correction coefficient k that corresponds to the maximum value for Reynolds number Re that regulates the correction function.

Specifically, with the modified example of the third implementation mode, the correction function is regulated within a range between a first Reynolds number and a second Reynolds number, but it is acceptable to correct flow velocity v using correction coefficient k of a first predetermined value that corresponds to a first Reynolds number, when the Reynolds number Re of the fluid flowing within pipe 10 is smaller than the first Reynolds number, and to correct flow velocity v using correction coefficient k of a second predetermined value that corresponds to a second Reynolds number, when the Reynolds number Re of the fluid is larger than the second Reynolds number. In this way, it is possible to reduce the number of points needed to correct the broken-line approximation.

(Other Implementation Modes)

This invention as recorded above was described based on the implementation modes, but it should be understood that the descriptions and drawings that constitute a portion of this disclosure do not limit this invention. From this disclosure, various alternative implementation modes, working examples and operational technology should become clear to a person skilled in the art. For example, the material of the wedges is not limited to polyetherimide, and the material of the pipe is not limited to stainless steel. In such way it should be understood that this invention encompasses various implementation modes not recorded here.

DESCRIPTION OF THE SYMBOLS

10 Pipe
11 First Wedge
12 Second Wedge
101 First Ultrasonic Transducer
102 Second Ultrasonic Transducer
301 Time Measuring Component
302 Flow Velocity Computation Component
303 Logarithmic Correction Component
304 Logarithmic Correction Function Creation Component
333 Predetermined Value Correction Component
351 Logarithmic Correction Function Saving Component
352 Measurement Value Saving Component
381 Correction Function Saving Component
401 Output Device
402 Input Device

The invention claimed is:

1. An ultrasonic flow meter comprising:
a first ultrasonic transducer for making incident a first ultrasonic signal against a pipe through which a fluid flows;
a second ultrasonic transducer, disposed in a position capable of receiving said first ultrasonic signal, for making incident a second ultrasonic signal against said pipe;
a flow velocity computation component for computing a flow velocity of the fluid within said pipe based on a first time period during which said first ultrasonic signal passes through said pipe and arrives at said second ultrasonic transducer and on a second time period during which said second ultrasonic signal passes through said pipe and arrives at said first ultrasonic transducer;
a logarithmic correction function saving component for saving a logarithmic correction function that has performed broken-line approximation of a relationship between a logarithm of a Reynolds number and a correction coefficient for said flow velocity; and
a logarithm implementing correction component for correcting said flow velocity by using the correction coefficient that corresponds to said logarithm of the Reynolds number of the fluid,
wherein the logarithmic correction function is obtained by connecting a plurality of logarithms of Reynolds numbers and points indicating a combination of actual measured values of the correction coefficient corresponding thereto within a predetermined error range of an approximation line.

2. An ultrasonic flow meter according to claim 1, further comprising a logarithmic correction function creation component for receiving a multiplicity of combinations of a Reynolds number and a correction coefficient and for creating said logarithm implementing correction function.

3. An ultrasonic flow meter according to claim 1, further comprising a logarithmic correction function creation component for receiving a multiplicity of combinations of the logarithm of a Reynolds number and a correction coefficient and for creating said logarithmic correction function.

4. An ultrasonic flow meter according to claim 1, in which said first ultrasonic transducer comprises a first oscillator for emitting said first ultrasonic signal, and a first wedge for being disposed on said pipe so that said first ultrasonic signal will be made obliquely incident against said pipe.

5. An ultrasonic flow meter according to claim 1, in which said second ultrasonic transducer comprises a second oscillator for emitting said second ultrasonic signal, and a second wedge for being disposed on said pipe so that said second ultrasonic signal will be made obliquely incident against said pipe.

6. An ultrasonic flow meter according to claim 1, in which said flow velocity computation component computes the flow velocity of the fluid within said pipe based on an angle of emission of said first and second ultrasonic signals emitted from a pipe wall of said pipe to a cavity of said pipe.

7. An ultrasonic flow meter according to claim 6, in which the angle of emission of said first ultrasonic signal emitted from the pipe wall of said pipe to the cavity of said pipe is computed based on an angle of incidence of the first ultrasonic signal from said first ultrasonic transducer to said pipe, an acoustic velocity of said first ultrasonic signal at said first ultrasonic transducer, and the acoustic velocity of said first ultrasonic signal at the fluid flowing through said cavity.

8. An ultrasonic flow meter according to claim 6, in which the angle of emission of said second ultrasonic signal emitted from the pipe wall of said pipe to the cavity of said pipe is computed based on an angle of incidence of the second ultrasonic signal from said second ultrasonic transducer to said pipe, an acoustic velocity of said second ultrasonic signal at said second ultrasonic transducer, and the acoustic velocity of said second ultrasonic signal at the fluid flowing through said cavity.

9. A method for measuring flow that includes:
making incident a first ultrasonic signal from a first ultrasonic transducer against a pipe through which a fluid flows;
making incident a second ultrasonic signal from a second ultrasonic transducer, disposed in a position capable of receiving said first ultrasonic signal, against said pipe;
computing a flow velocity of the fluid within said pipe based on a first time period during which said first ultrasonic signal passes through said pipe and arrives at said second ultrasonic transducer and on a second time period during which said second ultrasonic signal passes through said pipe and arrives at said first ultrasonic transducer;
preparing a logarithmic correction function that has performed broken-line approximation of a relationship between a logarithm of a Reynolds number and a correction coefficient for said flow velocity; and
correcting said flow velocity by using said correction coefficient that corresponds to the logarithm of the Reynolds number of said fluid,
wherein the logarithmic correction function is obtained by connecting a plurality of logarithms of Reynolds numbers and points indicating a combination of actual measured values of the correction coefficient corresponding thereto within a predetermined error range of an approximation line.

10. A method for measuring flow according to claim 9 that further includes creating said logarithmic correction function based on a multiplicity of combinations of a Reynolds number and of a correction factor.

11. A method for measuring flow according to claim 9 that further includes creating of said logarithmic correction function based on a multiplicity of combinations of the logarithm of a Reynolds number and of a correction factor.

12. A method for measuring flow according to claim 9, in which said first ultrasonic transducer comprises a first oscillator for emitting said first ultrasonic signal, and a first wedge for being disposed on said pipe so that said first ultrasonic signal will be made obliquely incident against said pipe.

13. A method for measuring flow according to claim 9, in which said second ultrasonic transducer comprises a second oscillator for emitting said second ultrasonic signal, and a second wedge for being disposed on said pipe so that said second ultrasonic signal will be made obliquely incident against said pipe.

14. A method for measuring flow according to claim 9, in which the flow velocity of the fluid within said pipe is computed based on an angle of emission of said first and second ultrasonic signals emitted from a pipe wall of said pipe to a cavity of said pipe.

15. A method for measuring flow according to claim 14, in which the angle of emission of said first ultrasonic signal emitted from the pipe wall of said pipe to the cavity of said pipe is computed based on an angle of incidence of the first ultrasonic signal from said first ultrasonic transducer to said pipe, an acoustic velocity of said first ultrasonic signal at said first ultrasonic transducer, and the acoustic velocity of said first ultrasonic signal at the fluid flowing through said cavity.

16. A method for measuring flow according to claim 14, in which the angle of emission of said second ultrasonic signal emitted from the pipe wall of said pipe to the cavity of said pipe is computed based on an angle of incidence of the second ultrasonic signal from said second ultrasonic transducer to said pipe, an acoustic velocity of said second ultrasonic signal at said second ultrasonic transducer, and the acoustic velocity of said second ultrasonic signal at the fluid flowing through said cavity.

* * * * *